Figure 1:
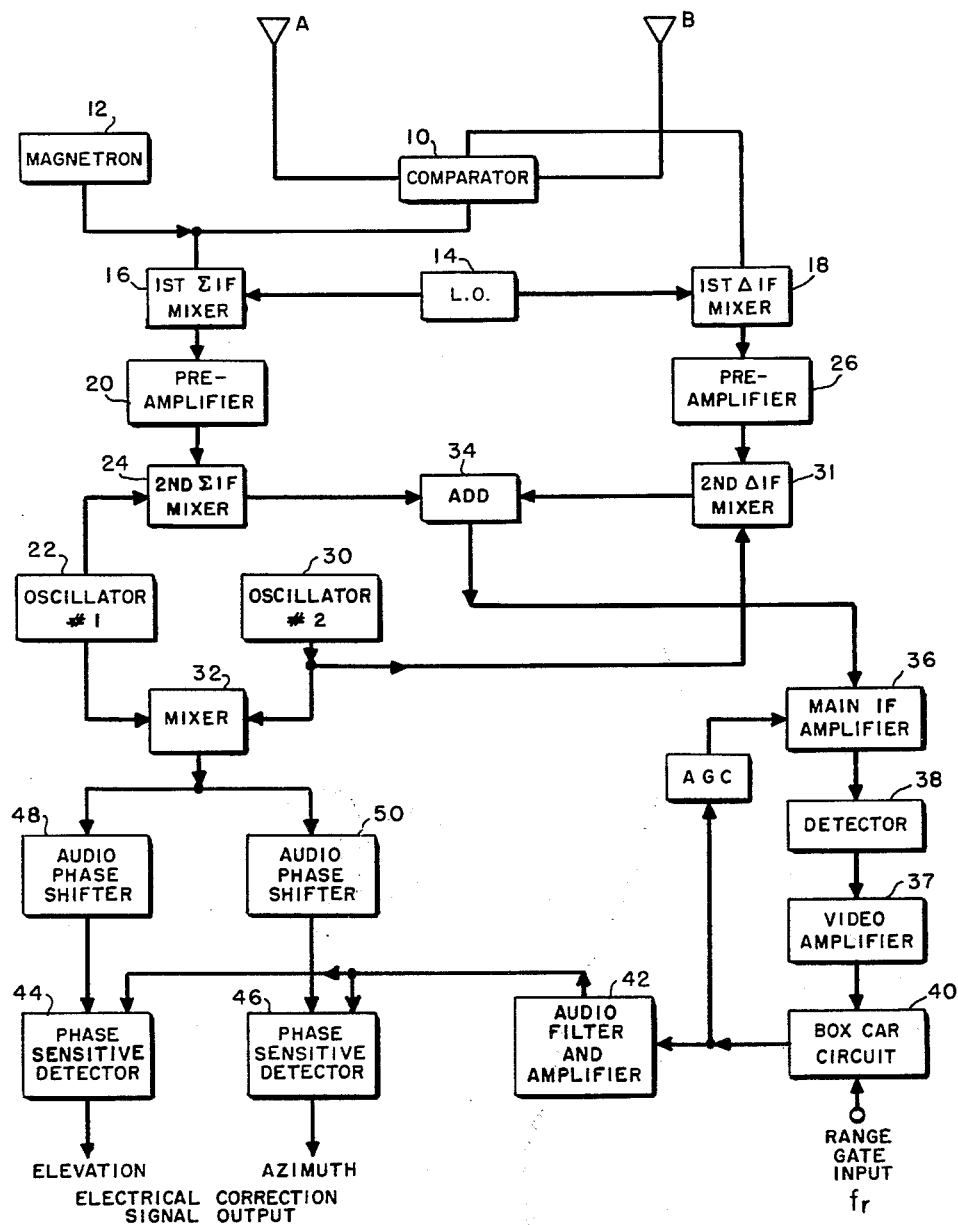

March 30, 1965   G. M. KIRKPATRICK ETAL   3,176,295
MONOPULSE RADAR SYSTEM

Filed May 16, 1958   2 Sheets-Sheet 2

OUTPUT OF AMPLITUDE DETECTOR 38

OUTPUT OF BOXCAR CIRCUIT 40

*INVENTORS,*
GEORGE M. KIRKPATRICK
*BY* LEWIS J. NEELANDS.

Harry M. Saragovitz
ATTORNEY.

United States Patent Office 3,176,295
Patented Mar. 30, 1965

3,176,295
MONOPULSE RADAR SYSTEM
George M. Kirkpatrick, North Syracuse, and Lewis J. Neelands, Cazenovia, N.Y., assignors to the United States of America as represented by the Secretary of the Army
Filed May 16, 1958, Ser. No. 737,180
6 Claims. (Cl. 343—16)

This invention relates to radar tracking systems and more particularly to monopulse type radar systems.

In the conventional combination amplitude-phase comparison monopulse radar system, the respective sum and difference signals derived from the antenna hybrid Magic-T coupler are amplified in two discrete channels which include IF amplifiers. The sum signal, $\Sigma$, is the summation of the signal from the full antenna aperture and is used for radar range measurements and as a signal reference. The difference, or $\Delta$, signal is made up of vertical and horizontal error components. The resultant error signal is amplified in the $\Delta$ IF amplifier and the vertical and horizontal components separated out in phase detector circuits. The azimuth error voltage component results from the phase difference $\phi$ of the $\Sigma$ and $\Delta$ signals and is in time quadrature with the sum signal. The elevation error signal results from the difference in magniture of the target signals off the boresight axis and is in time phase with the sum signal. Since amplitude and phase are both important in resolving the error signals, usually designated as error correction signals and abbreviated as ECS, into their components, the sum and delta receiver channels must have identical phase and gain characteristics. The accuracy of the error signal is seriously affected by both phase and gain differences of the receiver channels and also by phase differences caused by cross talk between the elevation error signal and the azimuth error signal as well as reduced angular sensitivity. However, the requirements for stability of gain and phase shift in the two separate channels are difficult to satisfy. Heretofore, such difficulties were met by designing the system components so as to keep phase and gain differences to a minimum, and to provide adjustments which must be checked frequently. Another alternative is to provide a monitoring system which continuously measures and corrects the gain and phase difference between channels. Both of these methods, however, add a great deal to the complexity of the system.

It is an object of the present invention to provide an improved monopulse radar system wherein the aforementioned difficulties are overcome.

It is another object of the present invention to provide a monopulse radar system wherein the effects of gain and phase differences in the IF system are greatly minimized.

In accordance with the present invention, there is provided a receiver for detecting error signals which measure the deviation of a target from the boresight axis of a combination amplitude-phase comparison monopulse type radar system. Included are means responsive to the detected target signals whereby there is produced a first sum and a first difference signal at a prescribed IF, but with the difference signal shifted in phase with respect to the sum signal. The phase angle is a measure of the deviation of the target from the boresight axis of the system. Also included are discrete means for converting the first sum IF signal and the first difference IF signal to respective second sum IF and second difference IF signals such that the frequency of the second sum signal and the frequency of the second difference signal differ by a prescribed audio frequency. In addition, there are included means for producing a signal having the prescribed audio frequency, and means for additively combining the second sum signal and the second difference signal whereby there is produced a component which includes the second sum signal and a difference signal amplitude modulated by the audio frequency signal and including the phase angle. In addition, there is included an amplifier responsive to the output of the additive means for simultaneously amplifying the second sum signal and the amplitude modulated difference signal, and means responsive to the output of the amplifier for recovering the envelope of the modulated difference signal whereby there is produced the audio frequency signal shifted in phase by the phase angle. Further included are means for comparing the generated audio frequency signal and the audio frequency signal including the phase angle whereby the phase angle is detected as the error correction signal.

Figure 2:
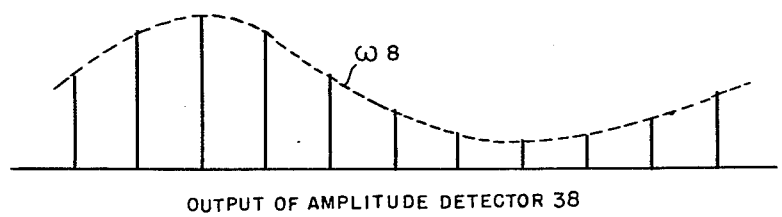
Figure 3:
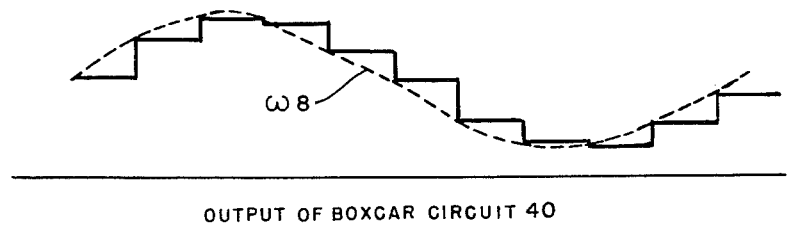

For a better understanding of the invention, together with other and further objects thereof, reference is had to the following description taken in connection with the accompanying drawings in which:

FIG. 1 is a block schematic diagram of the monopulse system, and
FIGS. 2 and 3 are explanatory curves.

Referring now to FIG. 1 of the drawing, A and B schematically represent the two antennas of a combination amplitude-phase comparison monopulse radar system. Physically, the antennas are placed side by side in a horizontal plane, but tilted, one up and one down, in the vertical plane. A complete description of the antenna arrangement in the combination amplitude-phase comparison monopulse radar system is disclosed in the copending application of George M. Kirkpatrick for "Improved Monopulse Radar System," Serial Number 677,181. The antennas A and B are each coupled to a "balanced duplexer" or waveguide hybrid comparator circuit 10. Such "balanced duplexer" circuits are well known in the art and are fully described in U.S. Patent 2,445,895 dated July 27, 1948. The comparator circuit 10 permits power fed from a pulsed transmitter magnetron 12 through a conventional ATR circuit (not shown) at a prescribed PRF to be radiated in the same phase from antennas A and B, but the received echo pulse detected by each of the antennas is combined in the comparator circuit to produce discrete sum and difference signals designated by the symbols $\Sigma$ and $\Delta$, respectively. It is to be understood, of course, that magnetron 12 is being pulsed at a prescribed PRF $f_r$. If the respective vector quantities at the antenna for a target echo are assumed to be $E_A$ and $E_B$, then the sum signal $$\Sigma = \frac{(E_A + E_B)}{\sqrt{2}}$$

and the difference signal $$\Delta = \frac{(E_A - E_B)}{\sqrt{2}}$$

It is to be understood, of course, that the frequency of the sum and difference signals is the same as that of the transmitted frequency and hereinafter referred to as $\Sigma$ sin $\omega_1 t$ and $\Delta$ sin $\omega_1 t$, respectively. The sum vector signal $\Sigma$ is proportional in magnitude to and has the sense of the vector sum of the amplitudes of the signals in antenna feeds A and B, and the difference vector signal $\Delta$ is proportional in magnitude to and has the same sense of the vector difference between the amplitudes of the signal in antenna feeds A and B. The sum signal $\Sigma$ sin $\omega_1 t$ and the difference signal $\Delta$ sin $[\omega_1 t + \phi]$, where $\phi$ is the phase shift of the difference channel with respect to the sum channel, are each heterodyned with the ouptput frequency derived from a local oscillator 14 in respective first $\Sigma$ IF and first $\Delta$ IF mixer circuits 16 and 18 to produce respective first sum and first difference IF vector signals having a frequency $\omega_3$. The output from first sum mixer 16, hereinafter designated as $\Sigma \sin \omega_3 t$, is amplified in preamplifier 20, and the amplified $\Sigma \sin \omega_3 t$ signal is heterodyned with the output frequency $\omega_5$ derived from an oscillator 22 in a second $\Sigma$ IF mixer 24 to produce a second $\Sigma$ IF signal having a frequency $\omega_6 = \omega_5 - \omega_3$ and hereinafter designated as $\Sigma \sin \omega_6 t$. Similarly, the output from first difference mixer 18 hereinafter referred to as $\Delta \sin(\omega_3 t + \phi)$ is amplified in preamplifier 26, and the amplified output thereof is heterodyned with the output frequency $\omega_4$, derived from an oscillator 30 in a second $\Delta$ IF mixer 31 to produce a second $\Delta$ IF signal having a frequency $\omega_7 = \omega_4 - \omega_3$ and hereinafter designated as $\Delta \sin(\omega_7 t + \phi)$. The frequencies $\omega_4$ and $\omega_5$ are so chosen that they differ by an audio frequency $\omega_8$ which is less than the pulse-repetition-frequency $f_r$ at which the magnetron transmitter 12 is pulsed, and are only a few hundred cycles apart. The respective outputs of oscillators 22 and 30 are heterodyned in audio mixer circuit 32 to produce a beat signal having the audio frequency $\omega_8 = \omega_5 - \omega_4$ and hereinafter designated as $K \sin \omega_8 t$, where the amplitude K may assume any suitable value. It is to be noted also that $\omega_8 = \omega_7 - \omega_6$. The following summarizes the relationships of the frequencies hereinabove described:

$$\omega_6 = \omega_5 - \omega_3$$
$$\omega_7 = \omega_4 - \omega_3$$
$$\omega_8 = \omega_5 - \omega_4$$
$$\omega_8 = \omega_7 - \omega_6$$
$$\omega_8 \leq f_r$$

As shown, the output signals from second $\Sigma$ IF mixer 24 and second $\Delta$ IF mixer 31 are added together in a suitable adder circuit 34 and the signal output therefrom is applied to the input of main IF amplifier 36. Since the $\Sigma$ IF pulses from mixer 24 and the $\Delta$ IF pulses from mixer 31 are on different frequencies, they can be added together for amplification in main IF amplifier 36, and, with the two signal outputs from $\Sigma$ IF mixer 24 and $\Delta$ IF mixer 31 only a few hundred cycles apart, there is no chance for phase shift to occur if operation is on a linear part of the phase curve of main IF amplifier 36. The amplified output from main IF amplifier 36 is applied to a conventional amplitude detector 38 which includes means for filtering out the IF frequency $\omega_3$. Thus, the output from detector 38 consists of video pulses modulated by the delta signal varying at the audio rate $\omega_8$ which, as hereinafter explained, is the difference signal component which is separated out and used for tracking. The detected modulated output from detector 38 is applied through video amplifier 37 as one input to a conventional box-car generator or, demodulator circuit, 40 which functions in a manner to stretch the video pulses from a target from one pulse repetition period to the next. As is well known, the box-car generator 40 consists of an electrical circuit that clamps the potential of a storage element, such as a capacitor, to the video pulse amplitude each time the pulse is received. At all times between the pulses, the storage element maintains the potential of the preceding pulse and is altered only when a new video pulse is produced whose amplitude differs from that of the previous one. As shown, there is also applied to the box-car circuit 40 a range gate input at the repetition frequency $f_r$, so that the box-car circuit 40 also acts simultaneously as a gating circuit to select the range element containing the target. The flat-step-like segments of the voltage output from box-car circuit 40 is shown in FIG. 3. This output is, in effect, a reconstruction of the envelope of the modulated pulses and it furnishes a large audio amplification plus a type of filter action that completely suppresses the PRF and all its harmonics. Thus the stretching action of box-car circuit 40 acts to amplify the desired difference frequency $\omega_8 = \omega_7 - \omega_6$ component and reduce the undesired harmonics. The output of box-car circuit 40 is applied to an audio filter and amplifier circuit 42 which filters out the unwanted cross-products in the output from box-car circuit 40 so that only the audio frequency $\omega_8$ is derived from the output of audio filter and amplifier circuit 42. As will be explained below, the audio frequency $\omega_8$ output from box-car circuit 40 and audio amplifier 42 includes the phase shift error signal and is applied as one input to two discrete phase sensitive detectors 44 and 46 where it is compared with the audio signal $K \sin \omega_8 t$ derived from mixer 32. As shown, the output from mixer 32 is applied to discrete audio phase shifters 48 and 50, the respective outputs of which are applied to the phase sensitive detectors 44 and 46, respectively, as reference comparison voltages. In addition to supplying the reference frequency $\omega_8$ to the phase sensitive detectors, audio phase shifters 48 and 50 permit the alignment of the phase sensitive detectors 44 and 46 to the most sensitive operating point. Also, audio phase shifter 48 introduces a 90° phase shift with respect to the output from audio phase shifter 50 so that the reference signals at frequency $\omega_8$ applied to the phase sensitive detectors 44 and 46 are shifted 90° with respect to each other. In this manner, the output of the phase sensitive detector 44 will provide the elevation ECS and the output of the phase sensitive detector 46 will provide the azimuth ECS. Each phase sensitive detector is insensitive to a quadrature component. The audio frequency $\omega_8$ chosen may be 400 cycles so that it could readily be used for an A.C. servo system adapted to operate at an error frequency of 400 cycles.

Although the monopulse system shown in FIG. 1 is a pulsed system, for purposes of clarity in explaining the operation of the system it will be considered as a CW radar. The principle of operation is the same for both cases but in this way the necessity for more complex expressions is eliminated. The operation of the circuitry from the antennas A and B to the second $\Sigma$ IF mixer 24 and the second $\Delta$ IF mixer 31 is conventional and hence no further explanation thereof is necessary. As hereinabove described, the signal output from $\Sigma$ IF mixer 24 is at frequency $\omega_6$ while the output from $\Delta$ IF mixer 31 is at frequency $\omega_7$, where $\omega_7$ and $\omega_6$ differ by the audio frenquency $\omega_8$ derived from mixer 32. IF the $\Sigma$ IF output from mixer 24 and the $\Delta$ IF output from mixer 31 are considered to be CW signals then $$\Sigma \sin \omega_6 t = \text{sum signal } \Sigma \text{ IF} \quad (1)$$

and $$\Delta \sin(\omega_7 t + \phi) = \text{difference signal } \Delta \text{ IF} \quad (2)$$

The phase angle $\phi$ is necessary because of the difference signal $\Delta$, originating from a combination phase-amplitude comparison system. As hereinabove described, $$\omega_7 - \omega_6 = \omega_8 \text{ (audio)} \quad (3)$$

so that $$\omega_7 = \omega_6 + \omega_8 \quad (4)$$

Now, substituting the value of $\omega_7$ from Equation 4 for $\omega_7$ in Equation 2, we have $$\Delta \sin[(\omega_6 + \omega_8)t + \phi] = \text{difference signal } \Delta \text{ IF} \quad (5)$$

Since the $\Sigma$ IF signals and the $\Delta$ IF signals derived from mixers 24 and 31 are at different frequencies, they can be added together and amplified simultaneously in main IF amplifier 36. Assuming that main IF amplifier 36 is operating on a linear part of its phase curve, then in view of the fact that the $\Sigma$ IF and $\Delta$ IF signal frequencies are only a few hundred cycles apart, there is no chance for differential phase shift to occur. The added signal input to main IF amplifier 36 from Equations 1 and 5 is $$S_{\text{Total}} = \Sigma \sin \omega_6 t + \Delta \sin[(\omega_6 + \omega_8)t + \phi] \quad (6)$$

If the sum signal of Equation 6 were observed on an oscilloscope the two components would appear to "beat" together at the audio rate of $\omega_8$. This "beat" is sampled by the PRF, $f_r$, since the actual signals in main IF amplifier 36 are pulses, and reconstructed by the non-linear action of the detector circuit. The "beat" contains the desired angle information and is recovered by the action of detector 38 and box-car circuit 40. Mathematically the presence of the "beat" can be shown in connection with Equation 6. By utilizing well known trigonometric relationships, Equation 6 can be expressed as $$S_{\text{Total}} = [\Sigma + \Delta \cos(\omega_8 t + \phi)] \sin \omega_6 t \\ + [\Delta \sin(\omega_8 t + \phi)] \cos \omega_6 t \quad (7)$$

The first term represents an amplitude modulated component which contains the desired angle information and the second term represents a phase modulated component, both having the audio modulation frequency $\omega_8$. The amplitude detector 38 recovers the amplitude modulation component and the resultant output of detector 38 is shown in FIG. 2. The box-car circuit reconstructs the envelope of the modulated pulses as shown in FIG. 3 to produce a final output given by $$\Sigma + \Delta \cos(\omega_8 t + \phi) \quad (8)$$

The box-car output of Equation 8 is applied as one input to each of the phase detectors 46 and 44 to which are also applied respectively reference signals $\sin \omega_8 t$ and $\cos \omega_8 t$ from audio phase shifters 48 and 50. Thus, the output of phase sensitive detector 46 will produce the azimuth ECS while phase sensitive detector 44 will produce the elevation ECS.

Although the use of the single amplifier channel following the second IF mixers will not eliminate the possibility of phase shift in the first mixers 16 and 18 and preamplifiers 20 and 26, it is believed that these circuits will be sufficiently stable to allow the ECS signal to be used over a portion of the antenna beam width. The use of two local oscillator signals differing by an audio frequency will further improve the gain and phase stability.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a combination amplitude-phase comparison monopulse radar system having means responsive to detected target signals whereby there is produced a first sum and a first difference signal at a first prescribed intermediate frequency, said difference signal having a prescribed phase angle with respect to said sum signal which is a measure of the deviation of the target from the boresight axis of the system, means for detecting the phase angle comprising: discrete means for converting said sum signal and said difference signal to respective second sum IF and second difference IF signals such that the frequency of said second sum signal and the frequency of said second difference signal differ by a prescribed audio frequency, means for generating a signal at said audio frequency, means for additively combining said second sum and said second difference signals whereby there is produced a component which includes said second sum signal and a difference signal amplitude modulated by said audio frequency, said modulated difference signal including said phase angle, an amplifier responsive to the output of said additive means for simultaneously amlifying said second sum signal and said amplitude modulated difference signal, means responsive to the output of said amplifier for recovering the envelope of the amplitude modulated difference signal whereby there is produced the audio frequency signal shifted in phase by said phase angle, and means for comparing said generated audio frequency and the audio frequency signal including said phase angle whereby said phase angle is detected.

2. In a monopulse radar system receiver of the combination amplitude-phase comparison type having means responsive to detected target signals whereby there is produced a first sum and a first difference signal at a first prescribed IF frequency, said difference signal having a prescribed phase angle with respect to said sum signal which is a measure of the deviation of the target from the boresight axis of the system, means for detecting the phase angle comprising: means for generating two discrete signals having respective frequencies which differ by a prescribed audio frequency, means for heterodyning said discrete signals for producing a signal having said prescribed audio frequency, means for heterodyning said first sum signal with one of said discrete signals to produce a second sum IF signal, means for heterodyning said first difference signal with the other of said discrete frequencies to produce a second difference IF signal, said second sum IF and second difference IF signals having frequencies which differ by said prescribed audio frequency, means for additively combining said second sum and said second difference signals whereby there is produced a component which includes said second sum signal and a difference signal amplitude modulated by said audio frequency, said modulated difference signal including said phase angle, an amplifier responsive to the output of said additive means for simultaneously amplifying said second sum signal and said amplitude modulated difference signal, means responsive to the output of said amplifier for recovering the envelope of the amplitude modulated difference signal whereby there is produced the audio frequency signal shifted in phase by said phase angle, and means for comparing the said described audio frequency signal and the audio frequency signal including said phase angle whereby said phase angle is detected.

3. In a combination amplitude-phase comparison monopulse radar system wherein the transmitted microwave frequency energy is pulsed at a prescribed PRF rate, a receiver for detecing error signals which are a measure of the deviation of a target from the boresight axis of the system comprising: means for producing sum and difference signals at said microwave frequency, said difference signal having a prescribed phase angle with respect to said sum signal which is a measure of the error signal, discrete means for converting said sum and said difference signals to respective first sum IF and first difference IF signals, discrete means for converting said first sum IF signal and said first difference IF signal to respective second sum IF and second difference IF signals such that the frequency of said second sum signal and the frequency of said second difference signal differ by a prescribed audio frequency, said audio frequency being less than said PRF rate, means for generating a signal at said audio frequency, means for additively combining said second sum and said second difference signal whereby there is produced a component which includes said second sum signal and a difference signal amplitude modulated by said audio frequency signal, said modulated difference signal including said phase angle, an amplifier responsive to the output of said additive means for simultaneously amplifying said second sum signal and said amplitude modulated difference signal, means responsive to the output of said amplifier for recovering the envelope of the amplitude modulated difference signal whereby there is produced the audio frequency signal shifted in phase by said phase angle, and means for comparing said generated audio frequency signal and the audio frequency signal including said phase angle whereby said phase angle is detected.

4. The system in accordance with claim 2 wherein said last mentioned means comprises a first and second audio signal phase shifter responsive to the audio frequency signal produced by heterodyning said discrete signal frequencies, the output of said second audio phase shifter being in space quadrature with the output of said first audio phase shifter, and a first and second phase sensitive detector responsive to the audio frequency signal including said phase angle, said space quadrature signals being applied as respective reference signals to said first and second phase sensitive detectors.

5. In a combination amplitude-phase comparison monopulse radar system wherein the transmitted microwave frequency energy is pulsed at a prescribed PRF rate, a receiver for detecting error signals which are a measure of the deviation of a target from the boresight axis of the system comprising: means for producing sum and difference signals at said microwave frequency, said difference signal having a prescribed phase angle with respect to said sum signal which is a measure of the error signal, discrete means for converting said sum and said difference signals to respective first sum IF and first difference IF signals, discrete means for converting said first sum IF signal and said first difference IF signal to respective second sum IF and second difference IF signals such that the frequency of said second sum signal and the frequency of said second difference signal differ by a prescribed audio frequency, said audio frequency being less than said PRF rate, means for generating a signal at said audio frequency, means for additively combining said second sum and said second difference signal whereby there is produced a component which includes said second sum signal and a difference signal amplitude modulated by said audio frequency signal, said modulated difference signal including said phase angle, an amplifier responsive to the output of said additive means for simultaneously amplifying said second sum signal and said amplitude modulated difference signal, means including an amplitude detector and a box-car detector circuit for recovering the envelope of the amplitude modulated difference signal whereby there is produced the audio frequency signal shifted in phase by said phase angle, said box-car circuit being gated at said PRF rate, means responsive to said generated audio frequency signal for producing two space quadrature signals at said generated audio frequency, a first phase sensitive detector responsive to one of said space quadrature signals and the audio frequency signal including said phase angle, and a second phase sensitive detector responsive to the other of space quadrature signals and the audio frequency signal including said phase angle.

6. In a combination amplitude-phase comparison monopulse radar system wherein the transmitted microwave energy is pulsed at a prescribed PRF rate, a receiver for detecting target signals comprising: means for producing sum and difference signals at said mocrowave frequency, said difference signal having a prescribed phase angle with respect to said sum signal which is a measure of the deviation of the target from the boresight axis of the system, discrete means for converting said sum and difference signals to respective first sum IF and first difference IF signals, means for generating two discrete signals having respective frequencies which differ by a prescribed audio frequency, said audio frequency being less than said PRF rate, means for heterodyning said discrete signals for producing a signal at said prescribed audio frequency, means for heterodyning said first sum IF signal with one of said discrete signals to produce a second sum IF signal, means for heterodyning said first difference IF signal with the other of said discrete signals to produce a second difference IF signal, said second sum IF signal and said second difference IF signal having frequencies which differ by said audio frequency, means for additively combining said second sum and said second difference signals whereby there is produced a component which includes said second sum signal and a difference signal amplitude modulated by said audio frequency signal, said modulated difference signal including said phase angle, an amplifier responsive to the output of said additive means for simultaneously amplifying said second sum signal and said amplitude modulated difference signal, means including an amplitude detector and a box-car detector circuit for recovering the envelope of the modulated difference signal whereby there is produced an audio frequency signal shifted in phase by said phase angle, said box-car circuit being gated at said PRF rate, means responsive to said prescribed audio frequency signal for producing two space quadrature signals at said audio frequency, a first phase sensitive detector responsive to one of said space quadrature signals and the audio frequency signal including said phase angle, and a second phase sensitive detector responsive to the other quadrature signal and the audio frequency signal including said phase angle.

No references cited.

CHESTER L. JUSTUS, *Primary Examiner.*